US012246415B2

(12) United States Patent
Sugiura et al.

(10) Patent No.: US 12,246,415 B2
(45) Date of Patent: Mar. 11, 2025

(54) SOCKET ADAPTER FOR IMPACT WRENCH

(71) Applicant: TONE CO., LTD., Osaka (JP)

(72) Inventors: Yuki Sugiura, Osaka (JP); Motohiro Hirao, Osaka (JP)

(73) Assignee: TONE CO., LTD., Osaka (JP)

( * ) Notice: Subject to any disclaimer, the term of this patent is extended or adjusted under 35 U.S.C. 154(b) by 183 days.

(21) Appl. No.: 17/861,429

(22) Filed: Jul. 11, 2022

(65) Prior Publication Data

US 2023/0013654 A1 Jan. 19, 2023

(30) Foreign Application Priority Data

Jul. 13, 2021 (JP) ................................ 2021-115428

(51) Int. Cl.
*B25B 23/00* (2006.01)
*B25B 21/02* (2006.01)

(52) U.S. Cl.
CPC .......... *B25B 23/0035* (2013.01); *B25B 21/02* (2013.01)

(58) Field of Classification Search
CPC ............................ B25B 23/0035; B25B 21/02
USPC ............ 81/177.85, 177.5, 124.6, 124.5, 125, 81/124.1
See application file for complete search history.

(56) References Cited

U.S. PATENT DOCUMENTS 6,145,416 A * 11/2000 Bonniot .............. B25B 23/0035 81/177.8
8,205,529 B1 * 6/2012 Laurie ................. B25B 23/0021 81/177.85

(Continued)

FOREIGN PATENT DOCUMENTS

JP 2000-218558 A 8/2000
JP 3148876 U 3/2009

OTHER PUBLICATIONS

European Patent Office, "Patent Translate" EPO and Google machine translation of JP3148876U, which document is cited and attached herewith, 11 pp., Jun. 17, 2022.

(Continued)

*Primary Examiner* — Hadi Shakeri

(74) *Attorney, Agent, or Firm* — Eckert Seamans Cherin & Mellott, LLC

(57) ABSTRACT

The present invention provides a socket adapter 10 for an impact wrench to prevent a manipulator ring 60 from being intentionally slid, the socket adapter comprising: a main body 11 including a cylinder section 20 having an engagement hole 21 to be installed in an insertion square 90 of the impact wrench, a shank section 40 configured to attach or detach a socket 80, and a drum section 30 positioned between the cylinder section and the shank section; a ball locking mechanism 50 adapted to switch the socket between a locked state where the socket cannot be detached and an unlocked state where the socket can be attached and detached by protrusion and retraction of a ball 51 housed in the shank section; a manipulator ring 60 slidably fitted on the drum section in the axial direction and configured to control the protrusion and retraction of the ball; and a starting resistance imparting means 70 for increasing the starting resistance of the manipulator ring when the manipulator ring begins to slide from a locking position where the ball protrudes to an unlocking position where the ball retracts.

5 Claims, 3 Drawing Sheets

(56) References Cited

U.S. PATENT DOCUMENTS

| | | | | |
|---|---|---|---|---|
| 8,602,285 | B2 * | 12/2013 | Santamarina | B25B 23/0035 81/463 |
| 2009/0049958 | A1 * | 2/2009 | Davidson | B25B 23/0035 81/177.85 |
| 2009/0173191 | A1 | 7/2009 | Davidson et al. | |
| 2020/0198102 | A1 * | 6/2020 | Wu | B25B 13/065 |

OTHER PUBLICATIONS

Japan Patent Office "Office Action" for corresponding Japanese Patent Application No. 2021-115428, includes English language machine translation, dated Jan. 8, 2025, 9 pp.

* cited by examiner

SOCKET ADAPTER FOR IMPACT WRENCH

TECHNICAL FIELD

This invention relates to a socket adapter configured to install into an insertion square of an impact wrench and to facilitate attachment and detachment of the socket.

BACKGROUND ART

An impact wrench is used in tightening and loosening fasteners such as bolts and nuts by attaching a socket to an insertion square (anvil) that serves as a drive shaft.

The insertion square has a pin inserting hole for pin-locking a socket in the direction perpendicular to the axial direction. To install a socket in the insertion square, the user operates to align the pin inserting hole of the insertion square with a pin inserting hole formed in the socket and then inserts a pin into the holes of the insertion square and the socket.

The sockets to be used have various diameters and shapes depending on the fastening member. It takes time and effort to attach and detach the socket by locking and unlocking the pin into the insertion square. In addition, the pin can sometimes drop or be lost, especially when working at a high altitude.

In view of the above, Patent document 1 proposes a socket adapter to be interposed between the insertion square and the socket. In this Patent Document 1, the socket adapter uses a pin locking mechanism for the insertion square and a ball locking mechanism for the socket to be attached to the forward end of the adapter.

This ball locking mechanism comprises a manipulator ring slidable in the axial direction to control the protrusion and retraction of a ball placed inside so that the user can switch the socket between a locked state where the socket is not detached and an unlocked state where the socket is attached or detached.

PRIOR ART DOCUMENT

Patent Document 1: Japanese Utility Model Registration No. 3148876

SUMMARY OF INVENTION

Problems to be Solved by the Invention

However, the socket adapter is susceptible to unintentional sliding due to vibration during tightening operation or contact with an obstacle, causing a likelihood of the manipulator ring unlocking and the socket detaching.

An object of the present invention is to provide a socket adapter for an impact wrench that can prevent the manipulator ring for controlling the ball locking mechanism from unintentionally sliding.

Means to Overcome the Problems

To solve the above problems, the present invention provides a socket adapter for an impact wrench, comprising:

a main body including a cylinder section having an engagement hole to be installed in an insertion square of the impact wrench, a shank section configured to attach or detach a socket, and a drum section positioned between the cylinder section and the shank section, a ball locking mechanism adapted to switch the socket between a locked state where the socket cannot be detached and an unlocked state where the socket can be attached and detached by protrusion and retraction of a ball housed in the shank section, a manipulator ring slidably fitted on the drum section in the axial direction and configured to control the protrusion and retraction of the ball, and a starting resistance imparting means for increasing the starting resistance of the manipulator ring when the manipulator ring begins to slide from a locking position where the ball protrudes to an unlocking position where the ball retracts.

The starting resistance imparting means comprises a groove formed in an outer periphery of the drum section, and a spring ring formed in a substantially C-shape and wound around the groove, wherein the spring ring is configured to contact a forward end of the manipulator ring in the locking position and provide a starting resistance for the manipulator ring.

The groove has a depth equal to or larger than a wire diameter of the spring ring.

The manipulator ring has a tapered surface formed on its forward end side and inclined to expand an inner diameter of the manipulator ring toward the forward end side, and the tapered surface comes into contact with the outer periphery of the spring ring in the locking position.

The spring ring is compressed in outer diameter by the tapered surface of the manipulator ring when the manipulator ring slid toward the unlocking position.

The shank section and the drum section have an insertion hole extending therethrough, the shank section has a ball accommodation hole extending from its side surface in the direction orthogonal to the insertion hole, and the ball locking mechanism comprises a push rod slidably provided in the insertion hole and configured to control the protrusion from and retraction into the ball accommodation hole of the ball and a biasing member for urging the push rod or the manipulator ring connected with the push rod toward the direction of protruding of the ball.

The drum section is formed on its side surface with a pin fitting hole extending in the axial direction between the locking position and the unlocking position of the manipulator ring and reaching the insertion hole, and the manipulator ring and the push rod are connected by a pin that passes through the pin fitting hole and is slidable in the pin fitting hole.

Effect of the Invention

The socket adapter for an impact wrench according to the present invention provides a starting resistance for the manipulator ring by a starting resistance imparting means. Therefore, a relatively strong force is required to start the manipulator ring when sliding it from the locking position toward the unlocking position. The manipulator ring does not move from the locking position, even if the user comes in contact with an obstacle or the impact wrench vibrates. So, the socket remains locked, and is prevented from being unintentionally detached from the adapter.

After the user operates to slide the manipulator ring from the locking position toward the unlocking position, the starting resistance imparting means does not substantially provide sliding resistance to the manipulator ring. Thus, the user can hold the manipulator ring in the unlocking position with a one-handed operation. In addition, the user can smoothly move the manipulator ring from the unlocking position to the locking position through the biasing member.

EMBODIMENT FOR CARRYING OUT THE INVENTION

One embodiment of a socket adapter for the impact wrench (hereinafter referred to as "socket adapter") 10 of the present invention will be described below with reference to the drawings.

Figure 1:
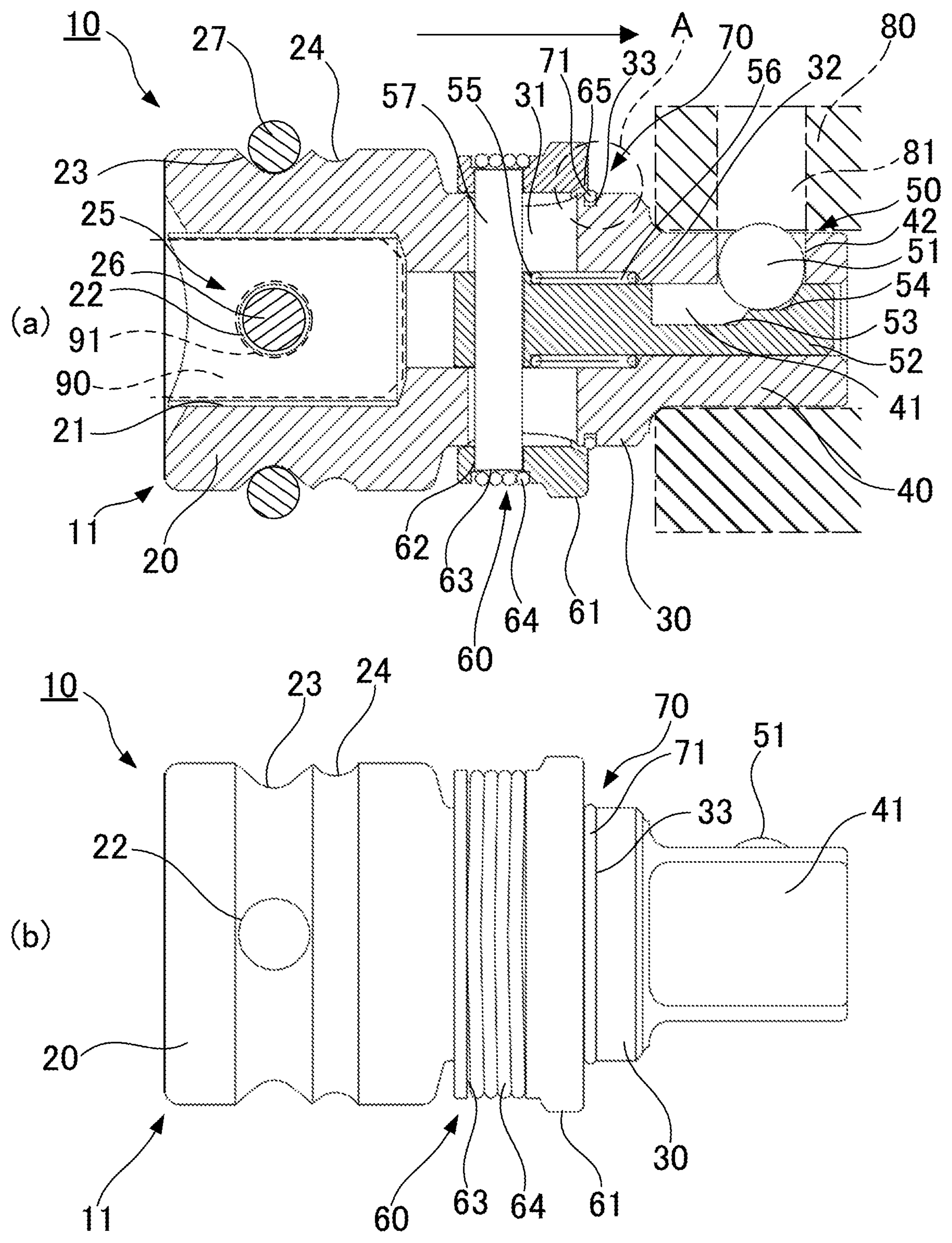
FIGS. 1(*a*) and (*b*) are a sectional view and a side elevation view, respectively, showing a locked state wherein a socket is attached to a socket adapter according to one embodiment of the present invention.
Figure 2:
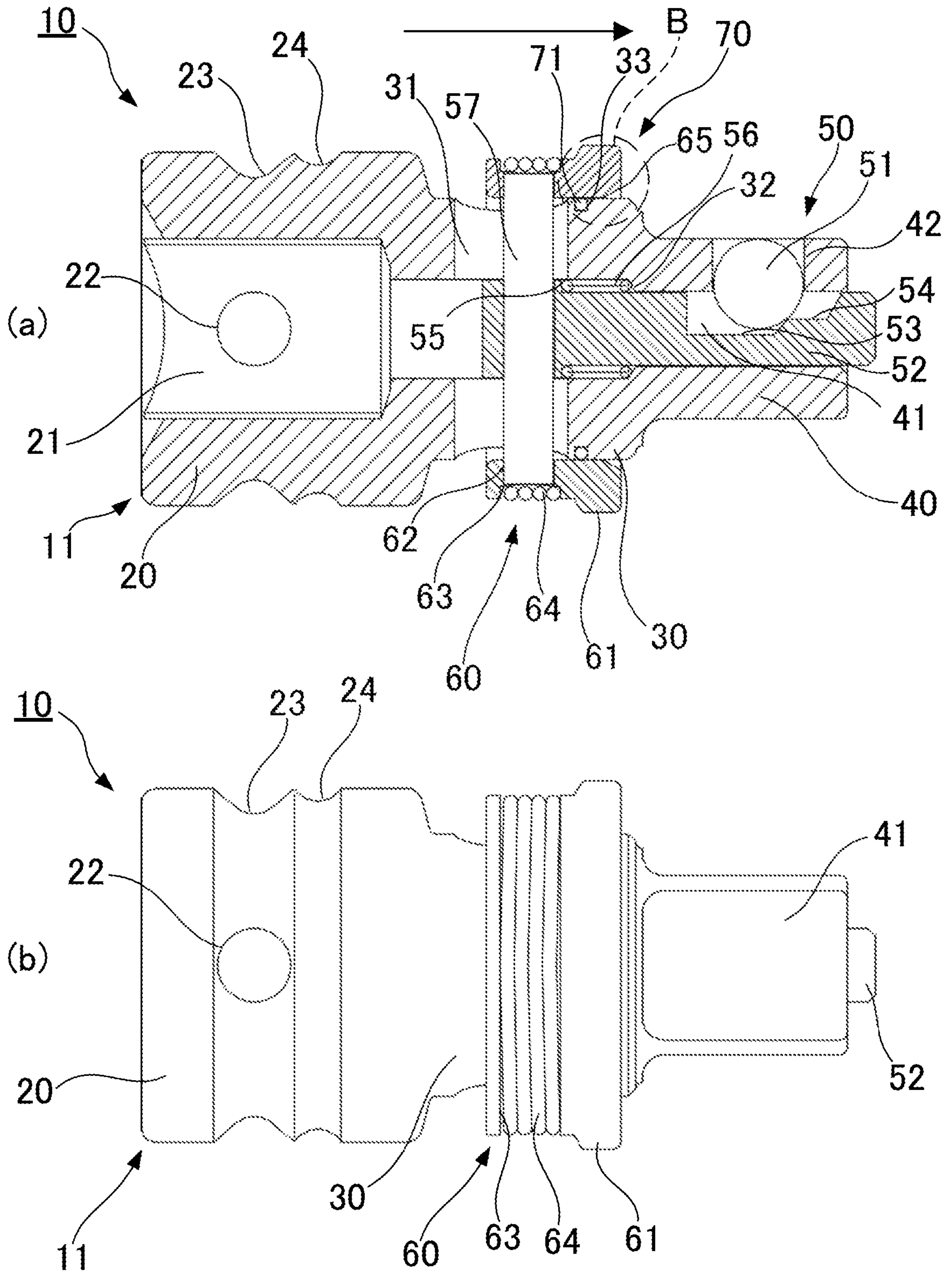
FIGS. 2(*a*) and (*b*) are a sectional view and a side elevation view, respectively, showing an unlocked state wherein a socket is attached to a socket adapter according to one embodiment of the present invention.

In FIGS. 1 and 2, (a) is a cross-sectional view and (b) is a side elevation view of the socket adapter 10 according to one embodiment of the invention. FIG. 1 shows a locked state wherein a ball 51 protrudes and a socket 80 shown in FIG. 1(*a*) cannot be detached. FIG. 2 shows an unlocked state wherein the ball 51 retracts and the socket 80 can be attached and detached.

As shown in FIGS. 1 and 2, the socket adapter 10 has a main body 11 that comprises a cylinder section 20 formed on the impact wrench side and configured to fit on an insertion square 90 (shown in FIG. 1(*a*)), a shank section 40 configured for the socket to be attached (shown in FIG. 1(*a*)), and a drum section 30 positioned between the cylinder section 20 and the shank section 40.

The cylinder section 20 on the impact wrench side is formed with an engagement hole 21 into which the prismatic insertion square 90 (also named "anvil") of impact wrench is insertable, as shown in FIG. 1(*a*). The socket adapter 10 and the insertion square 90 are detachably connected by, for example, a pin locking mechanism 25.

In more detail, as shown in FIG. 1(*a*), the pin locking mechanism 25 is configured to install the socket adapter 10 on the insertion square 90 by aligning a pin inserting hole 91 opened orthogonally to the axis center of the insertion square 90, with a pin inserting hole 22 opened orthogonally to the engagement hole 21 in the socket adapter 10, and then inserting a pin 26 in the pin inserting holes 22, 91. To prevent the pin 26 from falling out of the pin inserting holes 22, 91, the cylinder section 20 is formed on its outer periphery with a circumferential groove 23 extending over an open end of the pin inserting hole 22, and an O-ring 27 is fitted in the circumferential groove 23. An O-ring retreating groove 24 is formed next to the peripheral groove 23, and the insertion and removal of the pin 26 can be performed by migrating the O-ring 27 to the O-ring retreating groove 24.

A socket 80 is detachably provided on the forward end of the socket adapter 10, as shown in FIG. 1(*a*). The socket adapter 10 comprises a ball locking mechanism 50 that serves to attach or detach the socket 80.

The ball locking mechanism 50 is configured to hold the socket 80 detachably by protrusion or retraction of a ball 51 in the shank section 40. The socket 80 is formed with a locking hole 81 into which the ball 51 is fitted. The locking hole 81 can be shared with a pin inserting hole where pin 26 of the pin locking mechanism 25 is inserted when the socket 80 is attached directly to the insertion square 90.

The socket adapter 10 has an insertion hole 41 in the axial direction from the shank section 40 to the drum section 30. The shank section 40 is formed on its side surface with a ball accommodation hole 42 orthogonal to and reaching the insertion hole 41. A ball 51 is housed in the ball accommodation hole 42 and capable of partially protruding from a reduced diameter edge of the ball accommodation hole 42.

A push rod 52 is slidably accommodated in the insertion hole 41 and configured to control protruding and retracting of the ball 51. The push rod 52 is formed at different levels on its side surface with an unlocking groove 53 having a deep groove depth and a locking groove 54 having a shallow groove depth. In the illustrated embodiment for the push rod 52, the unlocking groove 53 is formed on its base end side, and the locking groove 54 is formed on a forward end side.

FIG. 1(*a*) shows a position where the push rod 52 has moved to the base end side of the insertion hole 41. This position is in a locked state wherein the locking groove 54 with a shallow groove depth contacts the ball 51, and the ball 51 partially protrudes from the ball accommodation hole 42 and cannot retract. In the locked state, the ball 51 enters the locking hole 81 of the socket 80, so that the socket 80 cannot be detached from the socket adapter 10.

On the other hand, FIG. 2(*a*) shows a position where the push rod 52 is moved to the forward end side of the insertion hole 41. This position is in an unlocked state wherein the unlocking groove 53 with a deep groove depth faces the ball 51, and the ball 51 can retract into ball accommodation hole 42. In the unlocked state, the ball 51 retracts into the ball accommodation hole 42, so that the socket 80 can be attached and detached.

The push rod 52 mentioned above has a mounting pin 57 provided on the base side thereof and extending vertically through the push rod 52, as shown in FIGS. 1(*a*) and 2(*a*). The push rod 52 is formed on the forward end side than the mounting pin 57 with a flange 55 to provide a step-shaped portion 32 in the insertion hole 41. A biasing member 56 is installed between the flange 55 and the step-shaped portion 32. An example of the biasing member 56 can be a compression spring, which forces the push rod 52 toward the base end side. In the unloaded state, the push rod 52 is held in the locking position where the locking groove 54 contacts the ball 51, as shown in FIG. 1(*a*).

The drum section 30 is formed on its side surface with a hole 31 into which the pin 57 is fitted. The hole 31 may be in the form of round hole, elongated hole, etc. The hole 31 is formed along the axial direction of the socket adapter 10 on the side surface of the drum section 30 and is long enough to allow the push rod 52 to slide between the locking position and the unlocking position.

The drum section 30 has a manipulator ring 60 provided for sliding the push rod 52 from the locking position to the unlocking position, as shown in FIGS. 1 and 2. In the illustrated embodiment, the manipulator ring 60 is provided on the forward end side thereof with a manipulating part 61 having a periphery protruding outward slightly to make it easy for the user to operate with fingers. The manipulator ring 60 is formed on the base end side than the manipulating part 61 with holes 62 opposite each other to insert the mounting pin 57 therethrough and engage therewith. The drum section 30 is formed in the peripheral surface thereof with a recessed groove 63 extending through an opened end of the mounting pin 57. A pin removal preventing member 64 is fitted in the recessed groove 63 to prevent the mounting pin 57 from falling out of the manipulator ring 60. The pin removal preventing member 64 as illustrated is a coiled spring, but may be an annular-shaped plate spring, O-ring, or other fixture device.

In the unloaded state, the manipulator ring 60 is urged toward the locking position on the base end side (cylinder section 20 side) by the biasing member 56 for biasing the push rod 52, as shown in FIG. 1. When the user operates from this state to push the manipulating part 61 toward the forward end, the manipulator ring 60 moves against the force from the biasing member 56.

The biasing member 56 applies a constant force to the manipulator ring 60 toward the locking position. So, if the force is weak, the manipulator ring 60 will likely move easily to the unlocking position due to vibration of the impact wrench or collision with an obstacle. Therefore, the biasing member 56 requires force enough to prevent the manipulator ring 60 from moving.

However, the user must keep fingers on the manipulator ring 60 while attaching the socket 80 to or detaching the socket 80 from the adapter 10. If the force exerted on the push rod 52 from the biasing member 56 is large, the user must keep firm pressure on the manipulator ring 60. In addition, the user needs to grasp the socket 80 with one hand when attaching the socket 80 to or detaching the socket 80 from adapter 10. Therefore, the user must hold the manipulator ring 60 and the impact wrench with one hand, while pressing the manipulator ring 60 with fingers. It is not convenient to operate if a large force is constantly exerted on the manipulator ring 60 from the biasing member 56.

The manipulator ring 60 requires such a configuration that makes it resistant for the manipulator ring 60 to slide only at the point where it is started from the locking position to the unlocking position, without a strong force constantly acting on the manipulator ring 60. The manipulator ring 60 also requires in the unlocking position beyond the starting point such a configuration that the user can slide it smoothly while depressing only by light force.

In the light of the above-mentioned requirements, the present invention provides a means 70 for imparting a starting resistance that increases the resistance of the manipulator ring 60 when it begins to start. The starting resistance imparting means 70 is configured to provide a larger starting resistance to the manipulator ring 60 only at the starting point of moving the manipulator ring 60 from the locking position to the unlocking position, and beyond the starting point, not to provide a resistance to the sliding movement of the manipulator ring 60.

Figure 3:
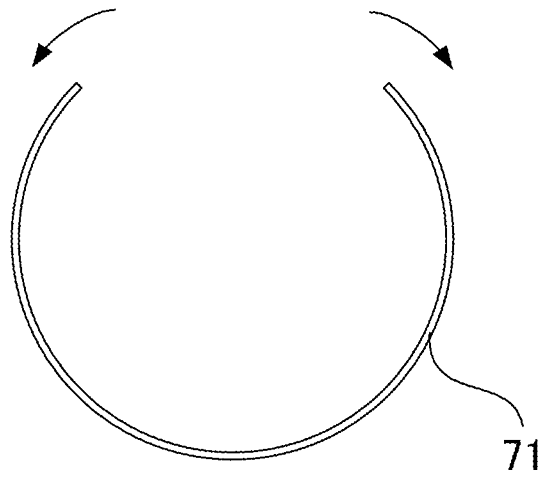
FIG. 3 is a plan view of a spring ring.

One embodiment of the starting resistance imparting means 70 is shown in FIG. 1(*a*), wherein the drum section 30 has a groove 33 formed in the forward end side of the manipulator ring 60 and running circumferentially around the drum section 30. A spring ring 71 is wound around the groove 33. The spring ring 71 may be a C-shaped spring with a restoring force in the direction of spreading outward, as indicated by arrows in FIG. 3.

Figure 4:
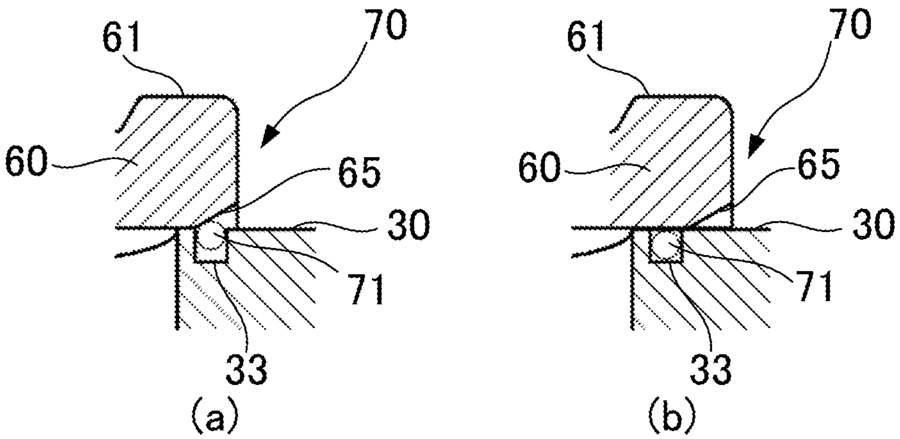
FIG. 4(*a*) is an enlarged view of A-portion shown in FIG. 1(*a*) and FIG. 4(*b*) is an enlarged view of B-portion shown in FIG. 2(*a*).

An enlarged view of the groove 33 is shown in FIG. 4(*a*). As illustrated, the groove 33 is formed at a position that overlaps the forward end of the manipulator ring 60 when the manipulator ring 60 is in the locking position. The groove 33 has a depth equal to or larger than the wire diameter of the spring ring 71, and the outer peripheral surface of the spring ring 71 is compressed by the manipulator ring 60, as shown in FIG. 4(*b*), so that the manipulator ring 60 is retractable in the groove 33.

As shown in FIGS. 1(*a*) and 4(*a*), the manipulator ring 60 is formed in its inner surface on the forward end side with a tapered surface 65 inclined to expand an inner diameter of the manipulator ring 60 toward the forward end side such that the spring ring 71 is compressed.

In operation, as shown in FIGS. 1(*a*) and 4(*a*), the spring ring 71 is loaded in the groove 33 in such a state that it is pressed inwardly against the restoring force. The manipulator ring 60 is fitted on the drum section 30 for the tapered surface 65 to face the spring ring 71 and groove 33. In the locking position, the outer peripheral surface of the spring ring 71 protrudes from the groove 33 and contacts the tapered surface 65 of the manipulator ring 60. Then, the spring ring 71 contacts the manipulator ring 60 and prevents the manipulator ring 60 from moving to the unlocking position. Therefore, when the socket 80 is attached to the adapter 10, the ball 51 fits into the locking hole 81 of the socket 80, and the socket 80 remains undetachable.

From this position, the user pushes the manipulating part 61 toward the distal end side of the socket adapter 10, as shown by the arrow in FIG. 1, to move the manipulator ring 60 to the unlocking position. In the locking position, as shown in FIG. 4(*a*), the outer peripheral surface of the spring ring 71 protrudes from the groove 33 in the manipulator ring 60. Therefore, to move the manipulator ring 60 to the unlocking position, the spring ring 71 must be compressed to reduce its outer diameter. The force for compressing the outer diameter of the spring ring 71 is the starting resistance of the manipulator ring 60. This starting resistance acts only on the starting point that allows the manipulator ring 60 to move from the locking position to the unlocking position.

In more particular, when the user moves the manipulator ring 60 in the direction of the arrow in FIG. 1(*a*), the outer peripheral surface of the spring ring 71 is compressed inwardly by the tapered surface of the manipulator ring 60 and is fitted into the groove 33. At this time, the manipulator ring 60 is also subjected to a biasing force from the biasing member 56 in the direction of returning to the locking position.

To perform this operation, the user needs to apply a strong force to the manipulator ring 60 at the starting point. This force is sufficient to prevent the manipulator ring 60 from moving from the locking position even if the user comes in contact with an obstacle or the impact wrench vibrates. Hence, the manipulator ring 60 does not move from the locking position, so the socket 80 is prevented from being unintentionally detached from the adapter 10.

As the user further operates to push the manipulator ring 60 forward, as shown in FIG. 2(*a*) and FIG. 4(*b*), the tapered surface 65 goes over the spring ring 71, and the outer peripheral surface of the spring ring 71 comes into sliding contact with the inner surface of the manipulator ring 60. Since this sliding resistance is minimal compared to the starting resistance, the force acting on the manipulator ring 60 is, in effect, only the force received from the biasing member 56 that enforces the push rod 52. As described above, the force applied from the biasing member 56 is relatively small, so the user can smoothly move the manipulator ring 60 to the unlocking position. This allows the user to keep the manipulator ring 60 pushing against the biasing member 56 while holding the impact wrench with one hand.

In this state, the ball locking mechanism 50 allows the ball 51 to retract, so the user can operate to attach and detach the socket 80 with one hand.

When the user detaches the socket 80 and releases the force applied on the manipulator ring 60, the manipulator ring 60 and the push rod 52 move toward the locking position by the force of the biasing member 56. When the tapered surface 65 of the manipulator ring 60 faces the spring ring 71, the spring ring 71 contacts the tapered surface 65 by a restoring force of spreading outward and forces the manipulator ring 60 toward the locking position in a combined power with the biasing member 56. Thus, the user can reliably return the manipulator ring 60 to the locking position. The ball locking mechanism 50 preserves the locked state wherein the ball 51 is protruding, as shown in FIG. 1.

As described above, the present invention provides the starting resistance imparting member 70 that increases only the starting resistance of the manipulator ring 60. Therefore, in the state where the socket 80 is attached to the shank section 40 of the adapter 10, the manipulator ring 60 does not move even if the user comes in contact with an obstacle or the impact wrench vibrates, so that the socket 80 is prevented from being unintentionally detached from the adapter 10. In addition, the increased resistance is applied only at the starting point, and the subsequent operation for sliding the manipulator ring 60 can be performed with only a small power, so that the user can handle the manipulator ring 60 with one hand. Therefore, even when the impact wrench is used at a high altitude, the user can safely attach the socket 80 to and detach the socket 80 from the adapter 10.

The above description is for the purpose of explaining the present invention, and should not be construed as limiting the scope of the invention described in the claims. In addition, each part of the present invention is not limited to the above embodiment, and it goes without saying that various modifications can be made within the technical scope described in the claims.

In the above embodiment, the user operates to push the manipulator ring 60 toward the distal end side of the adapter 10 to unlock the ball lock mechanism 50. However, the ball locking mechanism 50 can be unlocked by pulling the manipulator ring 60 toward the impact wrench side of the adapter 10. In this case, the starting resistance imparting means 70 can be configured to provide a starting resistance when the manipulator ring 60 moves toward the impact wrench side of the adapter 10

EXPLANATION OF REFERENCE NUMBERS

10 Socket adapter
11 Main body
20 Cylinder section
21 Engagement hole
30 Trunk section
33 Groove
40 Shank section
50 Ball locking mechanism
51 Ball
70 Starting resistance imparting means
71 Spring ring
80 Socket
90 Insertion square

The invention claimed is:

1. A socket adapter for an impact wrench, comprising:
a main body including a cylinder section having an engagement hole to be installed in an insertion square of the impact wrench, a shank section configured to attach or detach a socket, and a drum section positioned between the cylinder section and the shank section;
a ball locking mechanism configured to switch the socket between a locked state where the socket cannot be detached and an unlocked state where the socket can be attached and detached by protrusion and retraction of a ball housed in the shank section;
a manipulator ring having a tapered surface formed on its forward end side and inclined to expand an inner surface of the manipulator ring toward the forward end side and slidably fitted on the drum section in the axial direction and configured to control the protrusion and retraction of the ball; and
a starting resistance imparting means for increasing the starting resistance of the manipulator ring when the manipulator ring begins to slide from a locking position where the ball protrudes to an unlocking position where the ball retracts,
the starting resistance imparting means comprising
a groove formed in an outer periphery of the drum section and at a position that overlaps a forward end of the manipulator ring in the state where the manipulator ring is located in the locking position, and
a spring ring formed in a substantially C-shape and wound around the groove of the drum section, wherein in the state where the manipulator ring is located in the locking position, the spring ring protrudes from the groove of the drum section such that an inner diameter of the spring ring is larger than an outer diameter of a bottom of the groove, and the outer peripheral surface of the spring ring is in contact with the tapered surface of the manipulator ring to prevent the manipulator ring from moving to the unlocking position.

2. The socket adapter for an impact wrench according to claim 1 wherein the groove has a depth equal to or larger than a wire diameter of the spring ring.

3. The socket adapter for an impact wrench according to claim 1 wherein
the shank section and the drum section have an insertion hole extending therethrough,
the shank section has a ball accommodation hole extending from its side surface in the direction orthogonal to the insertion hole, and
the ball locking mechanism comprises a push rod slidably provided in the insertion hole and configured to control the protrusion from and retraction into the ball accommodation hole of the ball and a biasing member for urging the push rod or the manipulator ring connected with the push rod toward the direction of protruding of the ball.

4. The socket adapter for an impact wrench according to claim 3 wherein
the drum section is formed on its side surface with a pin fitting hole extending in the axial direction between the locking position and the unlocking position of the manipulator ring and reaching the insertion hole, and
the manipulator ring and the push rod are connected by a pin that passes through the pin fitting hole and is slidable in the pin fitting hole.

5. The socket adapter for an impact wrench according to claim 1 wherein
when the user starts to slide the manipulator ring from the locking position to the unlocking position, the spring ring is compressed by the tapered surface of the manipulator ring, thereby creating a starting resistance through a force exerted on the manipulator ring when the manipulator ring compresses the spring ring, when the user operates to slide the manipulator ring further toward the unlocking position, the tapered surface of the manipulator ring moves past the spring ring, and then the manipulator ring moves with its inner surface in contact of with the outer peripheral surface of the spring ring, thereby creating a sliding resistance through a force exerted by the contact between the inner surface of the manipulator ring and the outer peripheral surface of the spring ring, and the sliding resistance is smaller than the starting resistance.

* * * * *